(12) United States Patent
Levacher et al.

(10) Patent No.: US 11,315,120 B2
(45) Date of Patent: Apr. 26, 2022

(54) IMPLEMENTING A MARKETPLACE FOR RISK ASSESSED SMART CONTRACTS ISSUERS AND EXECUTION PROVIDERS IN A BLOCKCHAIN

(71) Applicant: INTERNATIONAL BUSINESS MACHINES CORPORATION, Armonk, NY (US)

(72) Inventors: Killian Levacher, Dundrum (IE); Stefano Braghin, Dublin (IE); Emanuele Ragnoli, Dublin (IE); Gokhan Sagirlar, Dublin (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 116 days.

(21) Appl. No.: 16/555,153

(22) Filed: Aug. 29, 2019

(65) Prior Publication Data

US 2021/0065188 A1 Mar. 4, 2021

(51) Int. Cl.
*G06Q 20/40* (2012.01)
*G06Q 20/38* (2012.01)

(52) U.S. Cl.
CPC ....... *G06Q 20/4016* (2013.01); *G06Q 20/389* (2013.01)

(58) Field of Classification Search
CPC .. G06Q 20/4016; G06Q 20/401; G06Q 20/40; G06Q 20/389; G06Q 20/38; G06Q 20/00
See application file for complete search history.

(56) References Cited

U.S. PATENT DOCUMENTS

| | | | |
|---|---|---|---|
| 2018/0240107 A1 | 8/2018 | Andrade | |
| 2018/0285796 A1 | 10/2018 | Kovacevic | |
| 2019/0102837 A1 | 4/2019 | Smith et al. | |
| 2019/0130368 A1* | 5/2019 | Li | G06Q 20/02 |
| 2019/0087893 A1 | 8/2019 | Pellew | |
| 2019/0305957 A1* | 10/2019 | Reddy | G06F 8/60 |
| 2019/0392511 A1* | 12/2019 | Mahajan | G06Q 30/08 |
| 2020/0074548 A1* | 3/2020 | Aidoo | G06Q 20/389 |
| 2020/0372154 A1* | 11/2020 | Bacher | H04L 41/147 |

FOREIGN PATENT DOCUMENTS

WO 2018140963 A1 8/2018

OTHER PUBLICATIONS

"Risks and opportunities for systems using blockchain and smart contracts" Chen et al./ May 2017 Research Gate/ (61 Pages).

* cited by examiner

*Primary Examiner* — Namrata Boveja
*Assistant Examiner* — Divesh Patel
(74) *Attorney, Agent, or Firm* — Griffiths & Seaton PLLC

(57) ABSTRACT

A system and method for implementing a marketplace for risk assessed smart contracts issuers and execution providers in blockchains in a computer environment are presented. A smart contract, issued by one or more blockchain nodes to a secondary blockchain and accepted by a primary blockchain, may be executed following a risk assessment to recursive call attack vulnerabilities of the smart contract according to a reputation of both the one or more blockchain nodes and the one or more execution nodes.

20 Claims, 8 Drawing Sheets

IMPLEMENTING A MARKETPLACE FOR RISK ASSESSED SMART CONTRACTS ISSUERS AND EXECUTION PROVIDERS IN A BLOCKCHAIN

BACKGROUND OF THE INVENTION

Field of the Invention

The present invention relates in general to computing systems, and more particularly to, various embodiments for implementing a marketplace for risk assessed smart contracts issuers and execution providers in blockchain by a processor.

Description of the Related Art

In today's society, consumers, corporate/business persons, educators, and others use various computing network systems with increasing frequency in a variety of settings. Computer systems may be found in the workplace, at home, or at school. Computer systems may include data storage systems, or disk storage systems, to process and store data. In recent years, both software and hardware technologies have experienced amazing advancement. With the new technology, more and more functions are added and greater convenience is provided for use with these computing systems.

SUMMARY OF THE INVENTION

Various embodiments for implementing a marketplace for risk assessed smart contracts issuers and execution providers in blockchains using one or more processors are provided. In one embodiment, by way of example only, a method for reducing risk of smart contracts in blockchains, again by a processor, is provided. A smart contract, issued by one or more blockchain nodes to a secondary blockchain and accepted by a primary blockchain, may be executed following a risk assessment to recursive call attack vulnerabilities of the smart contract according to a reputation of both the one or more blockchain nodes and the one or more execution nodes.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
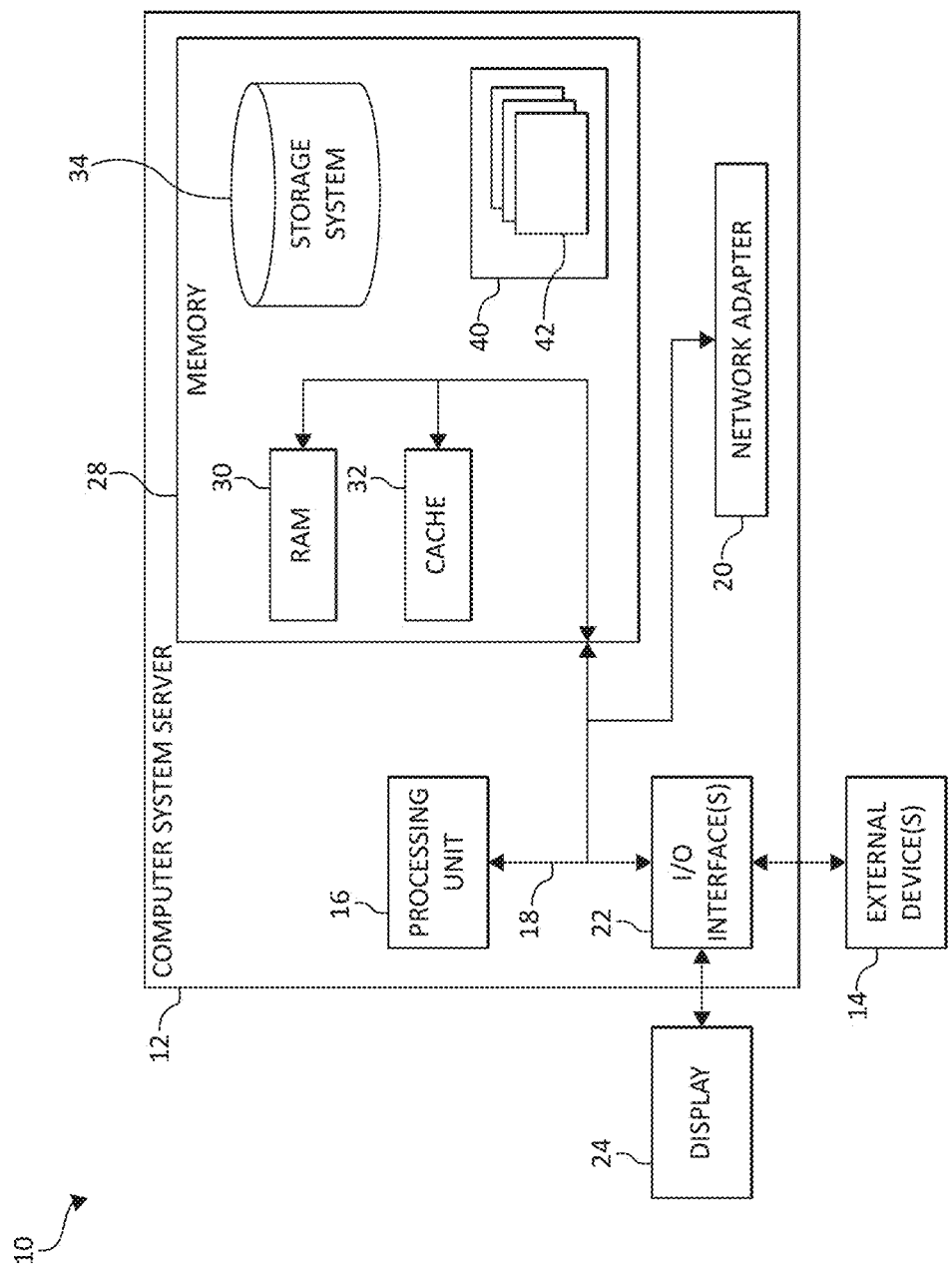
FIG. 1 is a block diagram depicting an exemplary computing node according to an embodiment of the present invention.

A blockchain is a distributed database that may be used to maintain a transaction ledger. A transaction ledger may denote an ordered set of transactions that have been validated or confirmed within a system up to a certain point in time. A transaction ledger may include a continuously-growing list of data records, where each data record may include data relating to one transaction. Further, encryption and other security measures may be used to secure the transaction ledger from tampering and revision. The blockchain may include a number of blocks, each block holding one or more individual transactions or data records. Further, each block may contain a timestamp and a link to a previous block. A blockchain network may be used and enabled users may be allowed to connect to the network, send new transactions to the blockchain, verify transactions, and/or create new blocks.

Additionally, the blockchain database maintains a continuously growing list of data records and is formed from blocks of data records that are connected together through the use of hashing. For example, every time a new block is added to the blockchain, the new block includes a hash of a prior block. In this manner, each additional block creates additional security for the validity of the entire blockchain. Each block records and confirms the sequence and timing of transactions, e.g., smart contracts, as they are created and/or executed. That is, smart contract provides for the storage of data within blockchain transactions and may also be automatically executed when predetermined terms and conditions are met.

A subset of blockchain platforms are Turing-complete systems that allow the storage of assets that can be managed with the use of application agents (e.g., "software agents") that are encoded on the blockchain. In one aspect, "assets" or "Blockchain assets" are a type of digital asset or cryptocurrency, and sometimes represent stakes in a particular project or company. This means that asset as used herein may represent any digital entity that can be immediately transferred such as, for example, cryptocurrency or other digital value. The amount and value of the asset of the blockchain itself is modified with a call and execution of the application agents. Hence, for example, an asset containing crypto-currencies, is enabled to know the crypto-currency value to know an increase or decrease of the crypto-currency value with the combined actions of multiple and heterogeneous software agents. If an application agent contains recursive functions with depleting or inflating skills/assets, the application agent can be exploited to generate a recursive call attack, that, if unchecked, causes the leak of the asset.

In one aspect, a need exists for risk analysis procedures to detect vulnerabilities discovered within a smart contracts and tracking the smart contracts through the use of a blockchain. In parallel, requirements for high transaction throughputs in blockchain systems have led to the development of decentralized market-driven delegation of smart contract execution. These marketplaces currently do not take into account the reputation of both smart contract issuers or the smart contract executing peers over time with respect to potential vulnerabilities associated with the smart contracts.

Accordingly, various embodiments described herein provide a solution for implementing and/or providing a marketplace for risk assessed smart contracts issuers and execution providers in blockchains using one or more processors are provided. In one aspect, the smart contract, issued by one or more blockchain nodes (e.g., an issuer node) to a secondary blockchain (e.g., a risk blockchain) and accepted by a primary blockchain (e.g., an execution blockchain), may be executed following a risk assessment to recursive call attack vulnerabilities of the smart contract according to a reputation of both the one or more blockchain nodes and the one or more execution nodes.

In one aspect, mechanisms of the illustrated embodiments provide smart contract risk assessment with a smart contract execution delegation blockchain eco-system. A marketplace may be defined and/or provided for buying and selling of smart contract execution services based on a smart contract's evaluated risk to that blockchain eco-system. In one aspect, the present invention may track the reputation of both execution nodes and smart contract issuers, based on the risks they currently/previously expose a blockchain ecosystem. It should be noted that both the execution nodes and smart contract issuers have reputation budgets. With respect to the issuer node (e.g., smart contract issuers), the reputation budget enables a risk aggregator module, through the use of an issuer entry function ("IEF") to allow the issuer node to initiate the procedure in the first place (i.e., it blocks off potential malicious issuer nodes from flooding the system with inappropriate/bad requests).

In one aspect, the risk of recursive call attacks in Turing-complete blockchains may be assessed. A probability of depleting assets (e.g., a smart contract) with software agents on Turing-complete blockchains may be assessed and measured. A usage of profiling tools, time windows computation and risk assessment may be combined to advise on the probability of assets depletion, on Turing-complete blockchains, via the exploitation of recursive functions.

In an additional aspect, the present invention provides for detecting recursive call attacks such as, for example, recursive call attacks in an asset management environment with one or more application agents. A time window may be determined and a risk of re-entry calls may be assessed using values of the assets stored on a blockchain.

It should be noted that as used herein, an "issuer node" (e.g., a blockchain node) may issue a smart contract to be executed by a blockchain network. An "executor node" or "execution node" (e.g., an execution blockchain or primary blockchain) may execute smart contracts submitted by issuer nodes. A "risk analyzer node" may perform a risk analysis over smart contracts issued.

In one aspect, the present invention may provide a blockchain network. The blockchain network may include one or more of the following. A risk blockchain ("BC") that may record risk assessment outputs of risk analyzer nodes. An execution blockchain ("BC") may record smart contract execution bids between issuer node(s) and executor node(s). A "risk aggregator module" ("RAM") may aggregate risk analysis reports from risk analyzer nodes. An execution bid matching module ("EBMM") may use an arbitrary function to match executor nodes to each issuer node requests. A "cyber-attack registry oracle module" may be an "oracle which provides a list of cyber-attack which previously occurred on the execution BC network.

In one aspect, as used herein, an analyzer risk evaluation value ("AREV") may be a value corresponding to a risk associated with a smart contract. A general risk evaluation value ("GREV") may be an aggregate of various AREVs values.

A reputation budget ("RB" or "reputation") may be a value such as, for example, a percentage and/or a value between [0,1] representing an issuer node's reputation. The RB may be initialized to selected value such as, for example, 0.5.

An issuer request reputation decrease ("IR_RD") may be a temporary decrease in an issuer node's RB by an arbitrary amount determined by the risk BC network. A risk assessment reputation decrease ("RA_RD") may be a temporary decrease in an issuer node's RB by an amount based upon the GREV value associated with a smart contract it issued. An execution risk reputation decrease ("ER_RD") may be a temporary decrease in an RB by an amount based upon the GREV value associated with a smart contract it issued. A responsible issuer reputation increase ("RI_RI") may be permanent fixed increase in an issuer node's RB. An execution honor reputation increase ("EH_RI") may be a permanent fixed increase in an executor node's RB.

Additionally, as used herein, an issuer entry function ("IEF") is a function which determines whether an issuer node can initiate a request to the risk BC. The IEF function takes into account various parameters (e.g., the issuer node's reputational risk, repetitional risk, any lagged time of inactivity since last request, etc.). A bid matching function ("BMF") may be a function which determines an optimal/best bid for a given execution ask.

An analyzer risk evaluation value ("AREV") may be a number produced by a risk analyzer node describing the risk associated with a smart contract. A risk assessment request ("RAR") may be recorded on the risk BC by the risk aggregator module/component on behalf of an issuer node. An execution request may be recorded on the execution bid BC by the execution bid matching module. An "execution ask" may be issued by issuer node. The execution ask may include one or more parameters within which a smart contract should be executed (e.g., latency, quality of service "QoS," etc.). An execution bid may be issued by an executor node with a price at which they are willing to honor the execution ask. An operational time window ("OTW") may be an arbitrary length of time within which a smart contract Issuer Node or Executor Node takes responsibility if any attack occurs.

It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

In general, "best," "appropriate," and/or "optimize" may be used herein interchangeable and refer to and/or defined as "maximize," "minimize," or attain one or more specific targets, objectives, goals, or intentions. "Best," "appropriate," and/or "optimize" may also refer to maximizing a benefit to a user (e.g., maximize a health state/patient profile). "Best," "appropriate," and/or "optimize" may also refer to making the most effective or functional use of a situation, opportunity, or resource.

Additionally, "best," "appropriate," and/or "optimize" may need not refer to a best solution or result but may refer to a solution or result that "is good enough" for a particular application, for example. In some implementations, an objective is to suggest a "best" combination of sections/items/defined objects, but there may be a variety of factors that may result in alternate suggestion of a combination of sections/items/defined objects yielding better results. Thus, some changes to the variety of factors may result in a jump from one minimum/maximum to another minimum/maximum. In either case, resulting suggestions of a combination of sections of the optimal/best executor nodes may be determined by whatever "bid matching function" may be considered "good enough," "substantially optimal," and/or "sufficiently good." Herein, the terms "best," "appropriate," and/or "optimize" may also refer to such results based on minima (or maxima, depending on what parameters are considered in the optimization problem) for suggesting of a combination of optimal/best executor nodes.

In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

Also, as used herein, a computing system may include large scale computing called "cloud computing" in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

It should be noted that one or more computations or calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
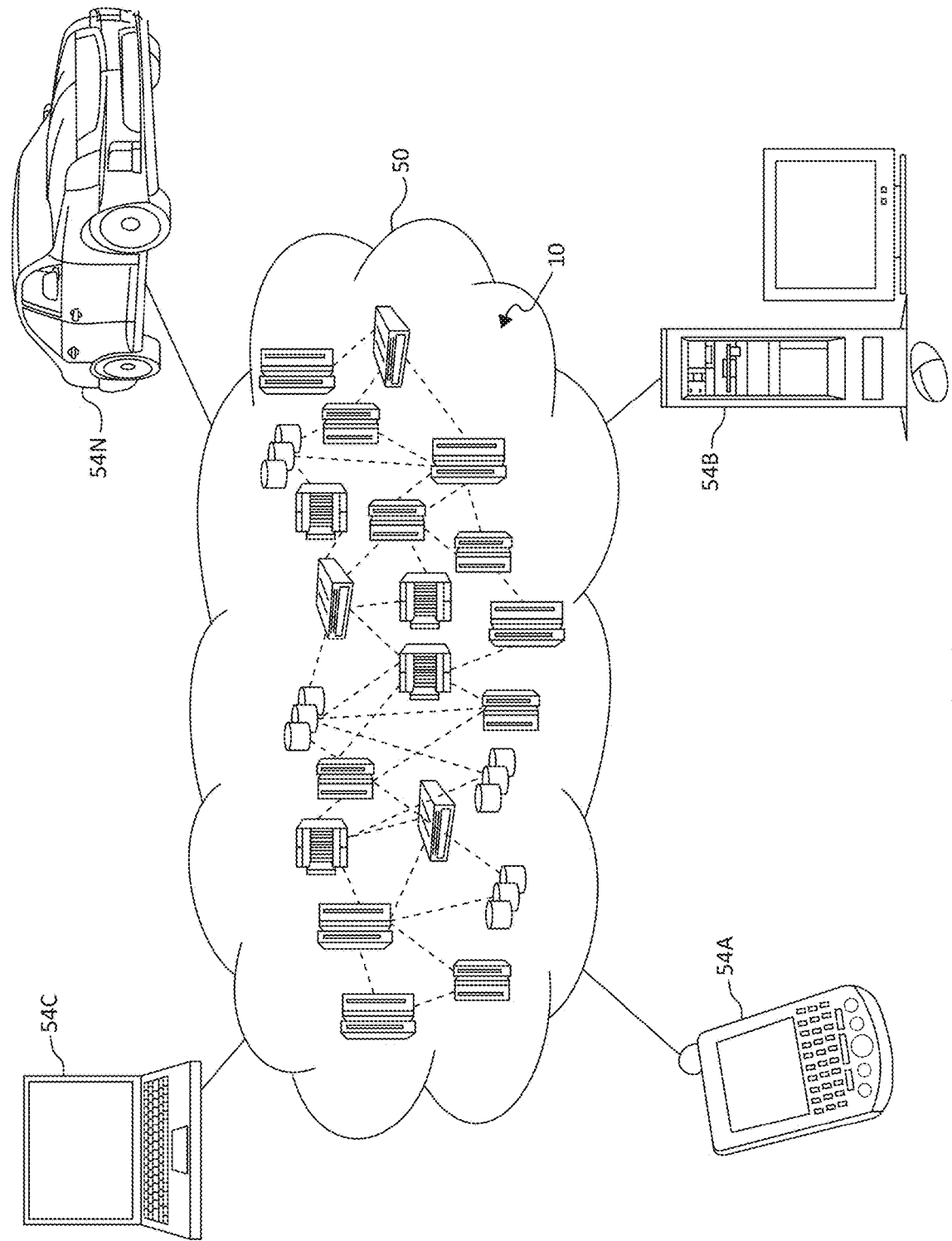
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
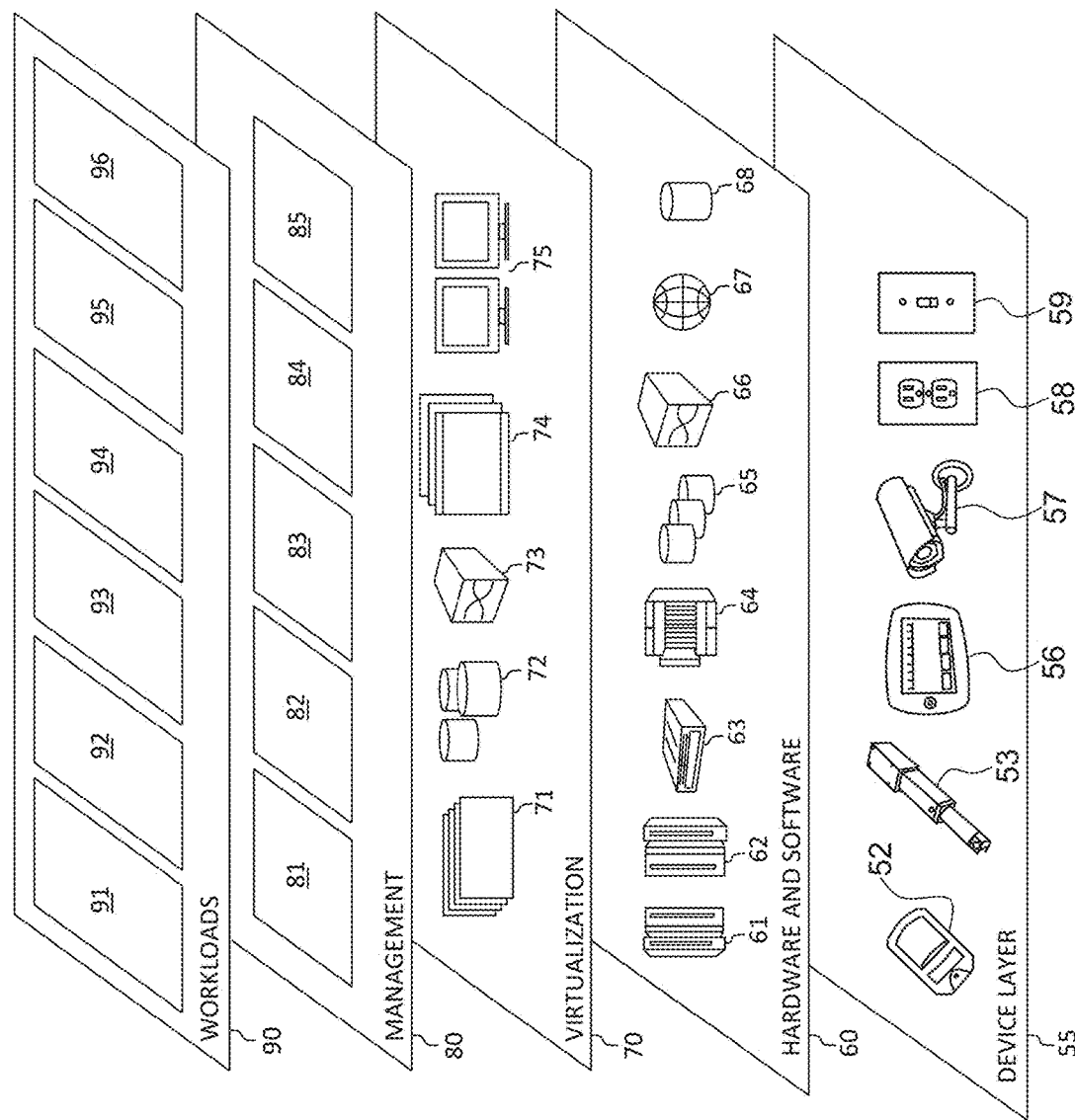
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for implementing/providing a marketplace for risk assessed smart contracts issuers and execution providers. In addition, workloads and functions 96 for implementing/providing a marketplace for risk assessed smart contracts issuers and execution providers may include such operations as data analytics, data analysis, and as will be further described, notification functionality. One of ordinary skill in the art will appreciate that the workloads and functions 96 for implementing/providing a marketplace for risk assessed smart contracts issuers and execution providers may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4A:
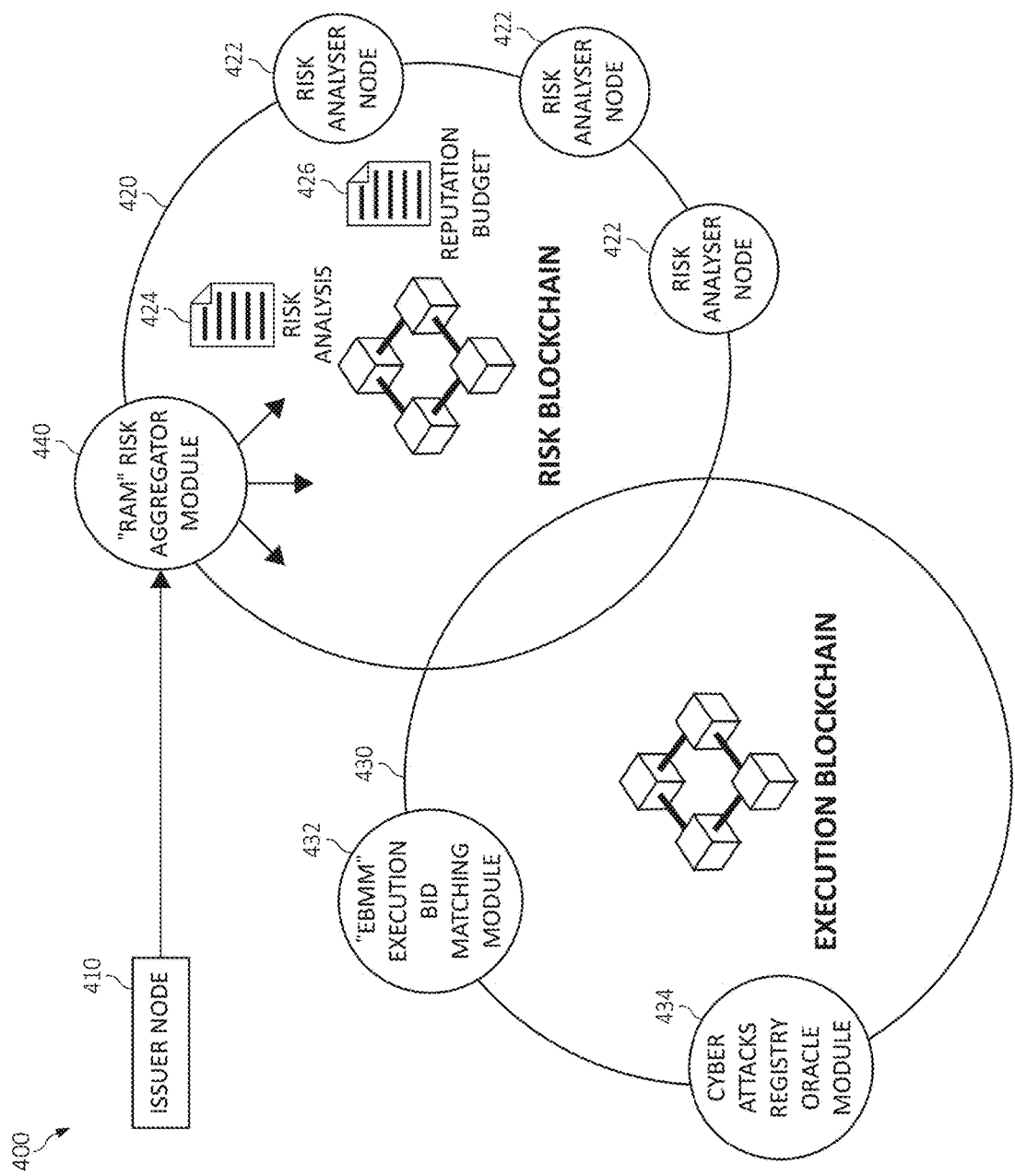
FIG. 4A-4B is an additional block diagram depicting an exemplary functional relationship and operations between various aspects of the present invention.
Figure 4B:
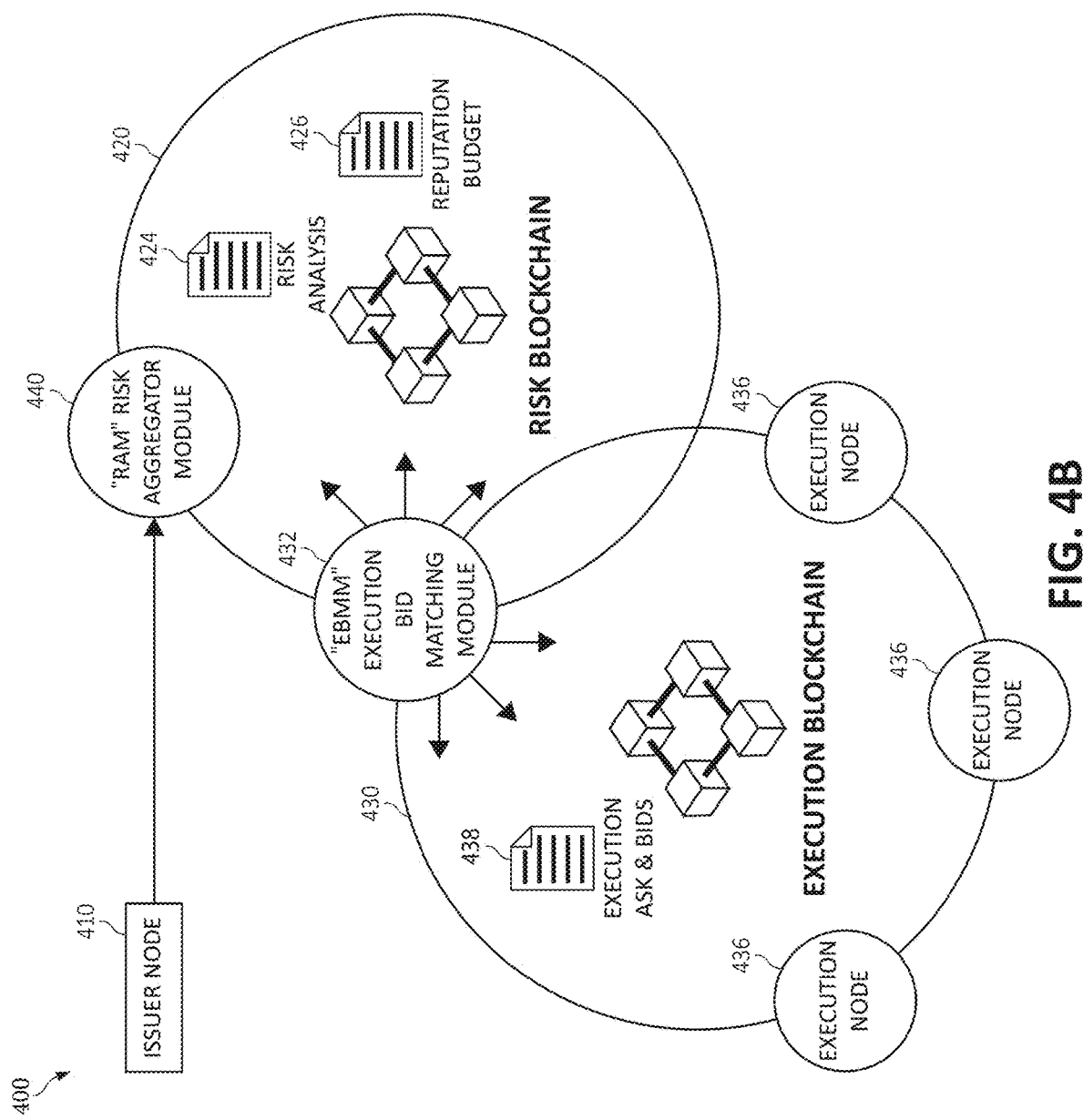

Turning now to FIGS. 4A-4B, a block diagram depicting exemplary functional components of system 400 and/or 415 according to various mechanisms of the illustrated embodiments is shown. FIGS. 4A-4B illustrates the system 400 for implementing/providing a marketplace for risk assessed smart contracts issuers and execution providers in a blockchain in a computing environment. As will be seen, many of the functional blocks may also be considered "modules" or "components" of functionality, in the same descriptive sense as has been previously described in FIGS. 1-3. With the foregoing in mind, the module/component blocks of system 400 (e.g., a blockchain network) and may also be incorporated into various hardware and software components of a system for cognitive data curation in accordance with the present invention. Many of the functional blocks of system 400 may execute as background processes on various components, either in distributed computing components, or on the user device, or elsewhere.

In one aspect, the computer system/server 12 of FIG. 1 may be used to assist the functional blocks of system 400 (e.g., the blockchain network). As one of ordinary skill in the art will appreciate, the depiction of the various functional units in the system 400 (e.g., the blockchain network) is for purposes of illustration, as the functional units may be located within the system 400 (e.g., the blockchain network) within and/or between distributed computing components.

In one aspect, the computer system/server 12 and/or the blockchain network 400 and 415 may provide virtualized computing services (i.e., virtualized computing, virtualized storage, virtualized networking, etc.) and/or be included in, a virtualized computing, virtualized storage, virtualized networking and other virtualized services that are executing on a hardware substrate.

As illustrated in the blockchain network 400 of FIGS. 4A and 4B, the illustrated embodiments enable a reputation-and-risk-based execution delegation marketplace. That is, FIG. 4A depicts a first phase ("phase 1") for performing a risk analysis for smart contracts issuers and execution providers in blockchain network 400 (e.g., "blockchain network"). FIG. 4B depicts a second phase ("phase 2") for execution market matching for execution of smart contracts in blockchain network 400. In one aspect, the first phase ("phase 1") of FIG. 4A is further described in FIG. 5 and the second phase ("phase 2") for execution market matching for execution of smart contracts in blockchain network 400 is further described in FIG. 6.

The blockchain network 400 may include a risk blockchain 420, an execution blockchain 430, and a set of issuer nodes/blockchain nodes such as, for example, issuer node 410. The risk blockchain 420 may include a set of risk analysis nodes such as, for example, 422A-C. The risk blockchain 420 may include a set of executor nodes such as, for example, execution nodes 436A-C of FIG. 4B. The risk blockchain 420 and the execution blockchain 430 may be associated with an execution bid matching module ("EBMM") 432 and a risk aggregation module ("RAM") 440, both of which may be included in the blockchain network 400.

In one aspect, the risk blockchain 420 may maintain and track a risk analysis 424 and a reputation budget 426. That is, the risk blockchain 420 may record the history of risk analysis 424 and the history of reputation budgets 426 available to the issuer node 410 and the execution nodes 436 operating in the blockchain network 400.

The execution blockchain 430 may record each execution ask, execution bid, and execution operation of the smart contract issued by the one or more blockchain nodes such as, for example, issuer node 410 for execution of the smart contract by the one or more execution nodes 436 of FIG. 4B. The execution ask (e.g., the execution ask and execution bid 438 that is a collection of the execution asks and execution bids) that also includes one or more parameters defining execution protocols for executing the smart contract. The execution bid (e.g., the execution ask and execution bid 438) indicates a transaction agreement rate between the one or more blockchain nodes and the one or more execution nodes for honoring the execution ask.

The execution blockchain 430 may record execution asks, execution bids and execution of the smart contracts submitted by issuer node 410. The issuer node 510 may submit smart contracts, the execution asks, and bid matching functions.

One or more risk analyzer nodes 422A-C may apply one or more risk analysis operations (e.g., a risk analysis 424) to the submitted smart contract and persist one or more values to the risk blockchain 420.

The RAM 440 (e.g., RAM module 440) may aggregate the risk values generated by the one or more risk analyzer nodes 422A-C to compute an aggregated risk value associated with the smart contract submitted by the issuer node 410.

The EBMM 432 (e.g., the EBMM module 432) may perform the matching between the execution asks and the execution bids (e.g., exe using the available bid matching functions.

The reputation associated to each node in the blockchain network 400 may be determined/computed with respect to the reported outcome of the execution of the smart contracts performed by one or more of the execution nodes 436A-C. That is, in relation to phase 3 of the protocol with 3 possible scenarios, in a first scenario, assuming everything went well, the RA_RD and ER_RD's temporary reputational budget decreases and are cancelled, and the EH_RI and RI_RI reputational budget increases are performed as a reward. In the second scenario, the executer nodes may not have honored their promise, but no attack occurred. For the issuer node, the same operations of the first scenario applies. For the executor node that made a mistake, the temporary ER_RD's decrease is canceled, as before, but a permanent ER_RD reputational decrease is performed. In the third scenario, an attack has occurred. In this case both the issuer node and the executor node are penalized. The previous temporary RA_RD and ER_RD's previously applied are made permanent.

Figure 5:
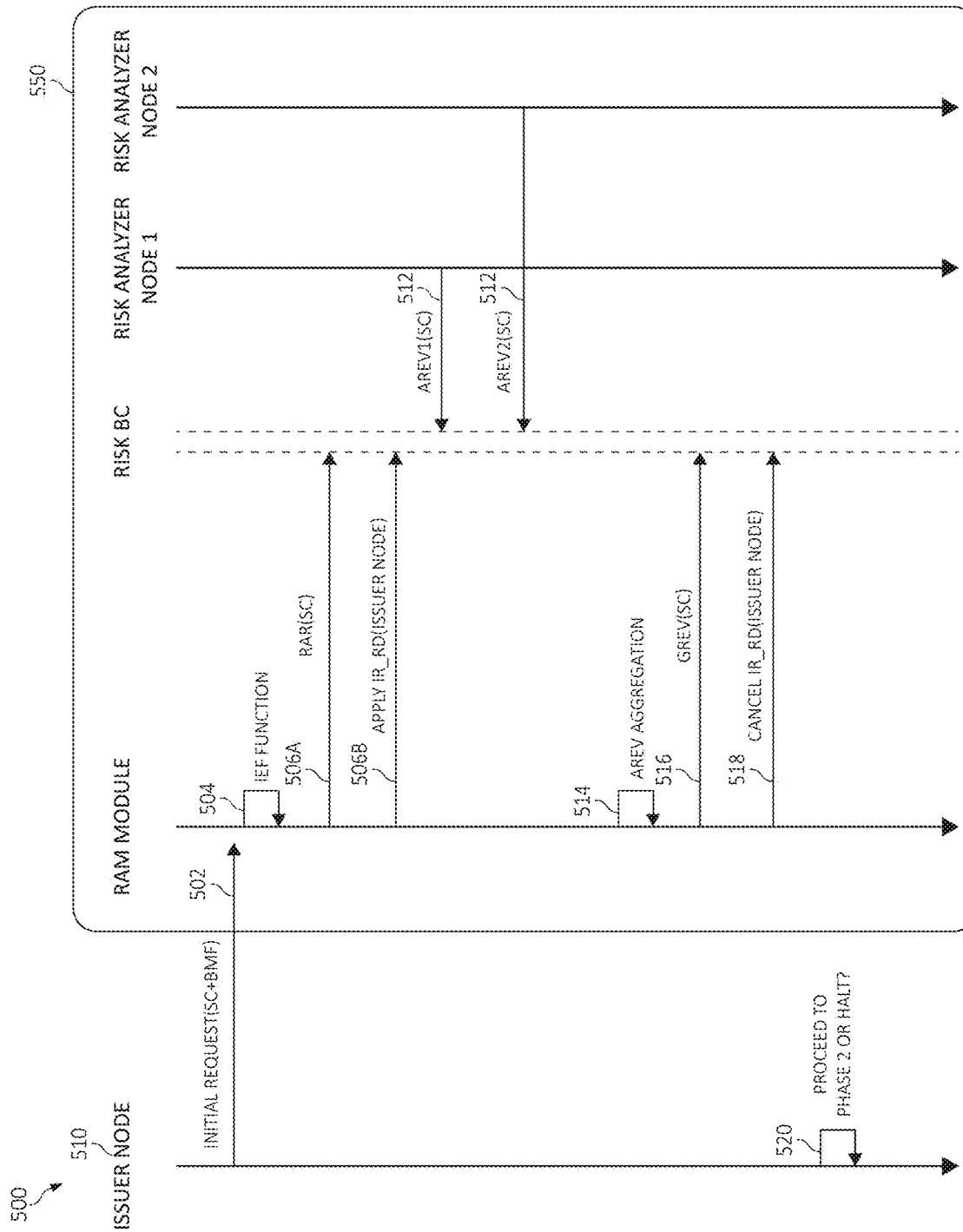
FIG. 5 is block diagram depicting an additional exemplary operations for performing a risk analysis for smart contracts issuers and execution providers in a blockchain in a by a processor, again in which aspects of the present invention may be realized.

Turning now to FIG. 5, a block diagram of exemplary functionality 500 of a first phase ("Phase 1" of FIG. 4A) relating to performing a risk analysis for smart contracts issuers and execution providers in a blockchain is depicted according to various aspects of the present invention. As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIGS. 4A-4B. With the foregoing in mind, the module blocks 500 may also be incorporated into various hardware and software components of a system for image enhancement in accordance with the present invention. Many of the functional blocks 500 may execute as background processes on various components, either in distributed computing components, or on the user device, or elsewhere, and performing generalized tasks performing a risk analysis for smart contracts issuers and execution providers in a blockchain (e.g., using two hyperledger blockchains such as, for example, a secondary blockchain and a primary blockchain).

Starting with the issuer node 510, the issuer node 510 sends an initial request to the risk aggregator module" ("RAM"), which contains: a) a new smart contract ("SC") that is to be executed, b) a bid matching function ("BMF") either i) based on a pre-existing default BMF provided by the execution bid matching module ("EBMM") or ii) an arbitrary one produced by the issuer node 510 itself (if this option is permitted by the blockchain system 500), and/or c) a set of arbitrary execution constraint parameters (e.g., execution speed, computational resources limits (i.e., gas limitation), etc.) within which the SC is to be executed. That is, the gas limitation refers to the concept specific to an Ethereum blockchain. "Gas" is the execution fee for every operation made on Ethereum and provides a way for smart contract issuers to pay for their smart contract to be executed in order for the other nodes involved to make the require computations for the smart contract to be executed. That is, it may be seen as a blockchain currency used specifically to pay for smart contract execution and when the "gas" runs out the smart contract stops executing.

In step 504, the IEF function, previously defined within the risk aggregator module, is then used to determine whether the issuer node 510 is permitted or not permitted to initiate a request. This decision takes into account the reputational budget of the issuer node 510 among various other parameters.

In step 506A, if the issuer node 510 is granted permission, the risk aggregator module records a risk assessment request ("RAR") for the SC on the risk BC, and in step 506B, a temporary issuer request reputation decrease ("IR_RD") is performed upon the issuer node's 510 reputation budget ("RB") on the risk BC. This is to prevent disk operating system ("DoS") attacks by issuer node's 510 on the risk assessment BC.

In step 512, one or more risk analyzer nodes (e.g., risk analyze node 1 and risk analyzer node 2) may apply various risk analysis algorithms over the SC, bid matching function ("BMF") and arbitrary execution constraint parameters submitted by the issuer node 510 and output an analyzer risk evaluation value ("AREV"), which may be between a range of [0,1]. This output may be associated with the SC and recorded on the risk BC.

In step 514, the risk aggregator module may aggregate all the AREVs to produce a general risk evaluation value ("GREV") which may be between a range of [0,1]. The operations used to produce a GREV in the risk aggregator module ("RAM") may be embodied using various strategies (e.g., averaging AREVs, AREV Max pooling, etc.).

In step 516, the GREV value may be associated with the SC and recorded on the risk BC and returned to the issuer node 510.

In step 518, the IR_RD decrease previously applied to the issuer node's reputational budget ("IR_RD") may be cancelled.

Figure 6:
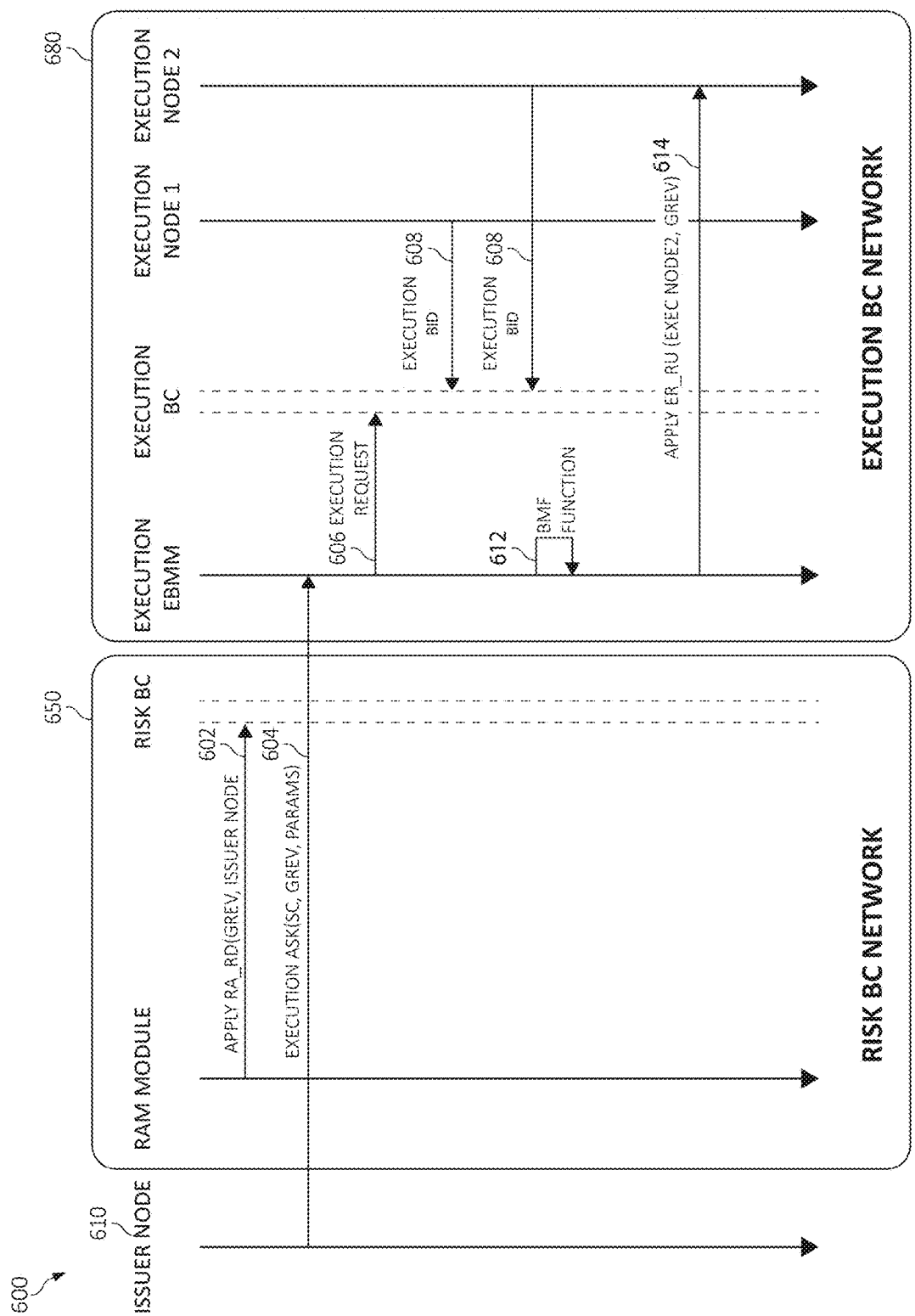
FIG. 6 is block diagram depicting an additional exemplary operations for execution market matching for execution of smart contracts in a blockchain by a processor, again in which aspects of the present invention may be realized.

In step 520, the issuer node 510 may or may not decide to proceed to phase 2 (e.g., proceed or halt), as described in FIG. 6.

Turning now to FIG. 6, a block diagram of exemplary functionality 500 of a second phase ("Phase 2" of FIG. 4B) relating to execution market matching for execution of smart contracts in a blockchain is depicted according to various aspects of the present invention. As shown, the various blocks of functionality are depicted with arrows designating the blocks' 600 relationships with each other and to show process flow. Additionally, descriptive information is also seen relating each of the functional blocks 600. As will be seen, many of the functional blocks may also be considered "modules" of functionality, in the same descriptive sense as has been previously described in FIG. 4. With the foregoing in mind, the module blocks 600 may also be incorporated into various hardware and software components of a system for image enhancement in accordance with the present invention. Many of the functional blocks 600 may execute as background processes on various components, either in distributed computing components, or on the user device, or elsewhere, and performing generalized tasks performing a risk analysis for smart contracts issuers and execution providers in a blockchain (e.g., using two hyperledger blockchains such as, for example, a secondary blockchain and a primary blockchain).

Starting with the issuer node 610, if the issuer node 610 decides to proceed to phase 2 (see step 520 of FIG. 5), a temporary risk assessment reputation decrease ("RA_RD") may be performed upon the issuer node 610 reputation budget on the risk BC network 650 based upon the GREV value previously returned. This is to limit the amount of risk an issuer node may potentially expose to a blockchain community.

In step 604, the issuer node 610 may produce an execution ask with: a) a set of arbitrary execution constraint parameters "params" (e.g., execution speed, computational resources limits (i.e., gas limitation) etc.) within which the issuer node 610 wants the SC to be executed, b) a maximum price (e.g., maximum transaction agreement rate) the issuer node 610 is willing to pay that may be calculated based upon the GREV associated with the SC, c) a time window value within which the issuer node 610 guarantees no attack, (from itself or any other node) involving the SC will occur. Here it may be assumed that all nodes part of the blockchain network may be behaving "honestly" with respect to the underlying standard blockchain operations. With respect, to behaving "honestly" with respect to the underlying standard blockchain operations, this means that cases relating to an underlying's blockchain may be not be operating properly (from the point of view of security). Also, it should be noted that the issuer node 610 may not be held responsible for generic blockchain attacks (e.g., related to Byzantine fault tolerances), which are addressed by extending the underlying blockchain protocol that may be used.

It should be noted that for purpose of the present invention, it may be assumed that the blockchain can handle/deal with blockchain attacks such as, for example, a Byzantine with blockchain attacks etc. Thus, the present invention builds on top of these more fundamental concerns. So by "behaving honestly" it is meant that the present invention may be assuming that any node involved within that blockchain is following correctly the underlying behavior expected by a particular blockchain in order to make collaborative decisions with other nodes.

In step 606, the execution bid matching module ("EBMM") records a new execution request containing on the execution bid BC: a) the S, b) the SC's GREV, c) the execution ask parameters, and/or d) the issuer node's 610 reputation budget.

In step 608, one or more executor nodes (e.g., execution node 1 and execution node 2) may produce an execution bid with a transaction agreement rate (e.g., price) at which the one or more executor nodes are willing to honor that execution ask. The execution bid may be submitted along with the executor node's (e.g., execution node 1 and execution node 2) reputational budget. Each execution bid is calculated based upon the GREV and issuer node's 610 reputation budget using an arbitrary cost function that may be selected by each executor node (e.g., execution node 1 and execution node 2).

In step 612, based upon the bid matching function ("BMF") previously chosen by the issuer node 610, the execution bid matching module ("EBMM") matches the optimal/best executor node bid to the execution ask. In one aspect, the optimal/best executor node bid may be determined by whatever "bid matching function" is provided by the issuer. For example, it may include checking which execution bid arrives first with a minimum threshold of requirements passed, or it can be something more complicated that tries to balance out various parameters. The "optimal/best" in each case may be determined by the issuer node itself through the bid matching function provided. If no bid matching function is provided, a default one is used.

In step 614, an execution risk reputation update ("ER_RU") operation may be performed upon the reputation budget ("RB") of the successful executor node (e.g., execution node 1 and execution node 2) upon the risk BC (e.g., execution blockchain ("BC") network 680), which temporarily decreases the reputation budget ("RB") based upon the GREV amount associated with the SC. This is to prevent the executor nodes (e.g., execution node 1 and execution node 2) and issuer nodes (e.g., issuer node 610) to assume and take on too much risk at once upon the execution BC.

Upon completion of the phase 2, the present invention may provide for a smart contract execution in a third phase ("phase 3"). The executor node may execute the SC which results in the possible scenarios.

In a first scenario ("scenario 1"), no attack occurred and the execution ask parameters were honored. The risk assessment reputation decreases ("RA_RD") and execution risk reputation decreases ("ER_RD") previously performed upon both the issuer node and the executor node may be cancelled. An execution honor reputation increase ("EH_RI") may be performed upon the executor node's RB as a reward for honoring the execution ask. A responsible issuer reputation increase (RI_RI) operation may be performed upon the issuer node's RB as a reward for issuing a SC that did not lead to an attack.

In a second scenario ("scenario 2"), no attack occurred but the execution ask parameters were not honored. The risk assessment reputation decreases ("RA_RD") and execution risk reputation decreases ("ER_RD") previously performed upon both the issuer node and the executor node may be cancelled. A responsible issuer reputation increase (RI_RI) operation may be performed upon the issuer node's RB as a reward for issuing a SC that did not lead to an attack. An execution risk reputation decreases ("ER_RD") may be performed upon the executor node's RB as a penalty for not respecting the execution bid parameters promise.

In a third scenario ("scenario 3"), an attack occurred. A cyber-attack registry oracle module may detect an attack occurred on the execution BC network. This attack involved the issuer node's SC within the time frame window guaranteed as part of the issuer node's ask request. The risk assessment reputation decreases ("RA_RD") and execution risk reputation decreases ("ER_RD") previously performed upon both the issuer node and the executor node may are made permanent.

Figure 7:
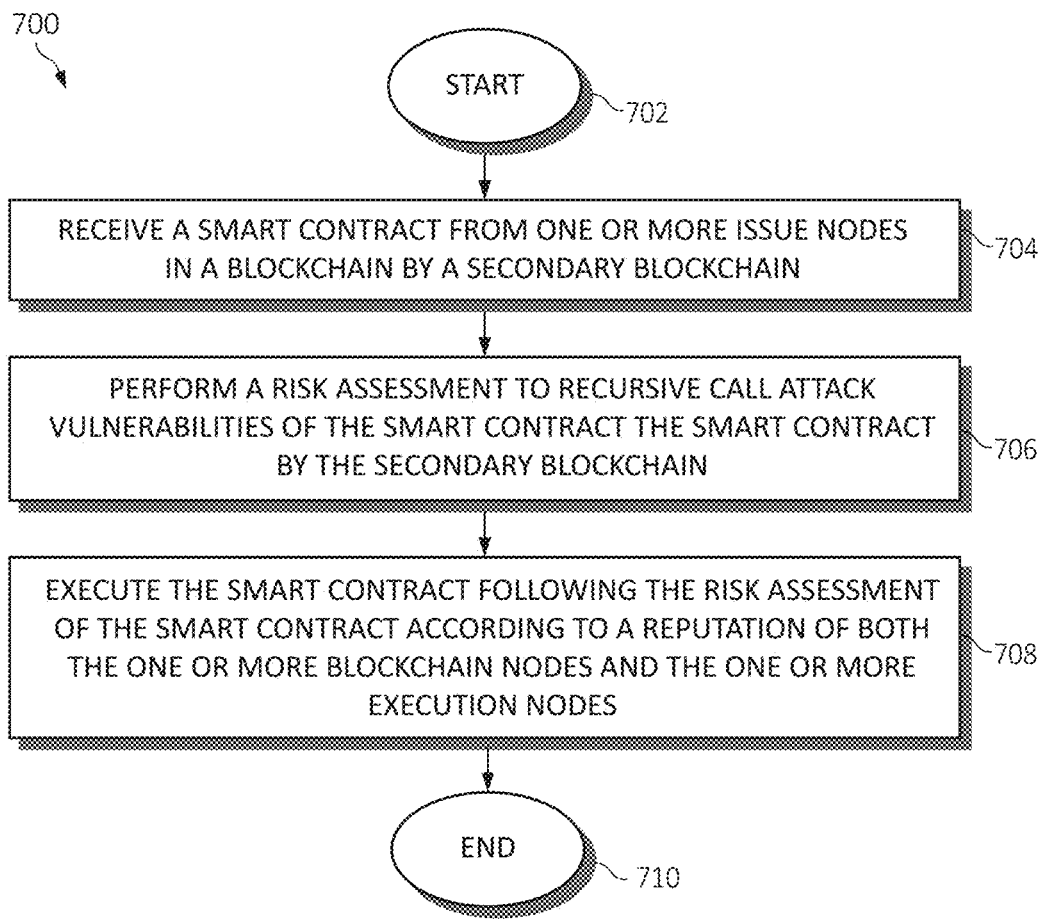
FIG. 7 is an additional flowchart diagram depicting an exemplary method for implementing a marketplace for risk assessed smart contracts issuers and execution providers in blockchain by a processor, again in which aspects of the present invention may be realized.

Turning now to FIG. 7, a method 700 for implementing a marketplace for risk assessed smart contracts issuers and execution providers in blockchain (e.g., Turing-complete blockchains) by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702.

A smart contract may be received from one or more issue nodes in a blockchain by a secondary blockchain (e.g., a risk blockchain), as in block 704. A risk assessment to recursive call attack vulnerabilities of the smart contract may be performed by the secondary blockchain, as in block 706. The smart contract, following the risk assessment of the smart contract, may be executed according to a reputation of both the one or more blockchain nodes and the one or more execution nodes, as in block 708. The functionality 700 may end, as in block 710.

In one aspect, in conjunction with and/or as part of at least one block of FIG. 7, the operations of method 700 may include each of the following. The operations of method 700 may record historical data of the risk assessment and the reputation of both the one or more blockchain nodes and the primary blockchain. The primary blockchain is an execution node, the secondary blockchain is a risk blockchain, and the issuing blockchain is one of a plurality of nodes within a blockchain (which includes the primary blockchain and the risk blockchain).

The operations of method 700 may record each execution ask, execution bid, and execution operation of the smart contract issued by the one or more blockchain nodes for execution of the smart contract by the one or more execution nodes. The execution ask includes one or more parameters defining execution protocols for executing the smart contract, the execution bid indicates a transaction agreement rate between the one or more blockchain nodes and the one or more execution nodes for honoring the execution ask.

The operations of method 700 may match, via the secondary blockchain, an execution ask and an execution bid of the smart contract issued by the one or more blockchain nodes for execution of the smart contract by the one or more execution nodes.

The operations of method 700 may apply a risk analysis operation to the smart contract and persist one or more values to the secondary blockchain, and/or aggregate one or more risk assessment values generated by the secondary blockchain and associated with the smart contract.

The operations of method 700 may define a marketplace for providing a transaction agreement for execution services of the smart contract based on the risk assessment to the smart contract, and/or track the reputation of both the smart contract issuers and the one or more execution nodes based on the risk assessment in the marketplace, wherein the marketplace includes the one or more blockchain nodes, the primary blockchain, and the secondary blockchain.

The operations of method 700 may determine the risk assessment to the recursive call attack vulnerabilities of the one or more smart contracts by the secondary blockchain from a plurality of nodes associated with the secondary blockchain, the primary blockchain, or a combination thereof. The plurality of nodes (e.g., issue nodes) are each permitted to submit smart contracts and the secondary blockchain permitted to determine the risk assessment of the smart contracts.

The operations of method 700 may also determine the risk assessment of recursive call attack vulnerabilities according to a recursive call attack threshold or according to risk vulnerability measurements based on a selected call function of asset values, one or more time profiles, and a number of times a variable appears in a suspicious list, determine a probability of depleting assets from the primary blockchain according to the risk vulnerability measurements, and/or determine a vulnerability risk according to a selected function of asset values, one or more time profiles, a number of times a variable appears in a suspicious list.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for implementing a marketplace for risk assessed smart contracts in blockchains by a processor, comprising:

receiving a smart contract issued by one or more blockchain nodes to a secondary blockchain and accepted by a primary blockchain;

in response to receiving the contract, performing a risk assessment to recursive call attack vulnerabilities of the smart contract, wherein the risk assessment identifies a probability of asset depletion in an asset management environment due to an exploitation of recursive functions to application agents in the primary blockchain based on a determined risk of re-entry calls occurring during a particular time window;

in conjunction with performing the risk assessment, determining a reputation of both the one or more blockchain nodes issuing the smart contract and one or more execution nodes which will execute the smart contract according to a reputational budget computed for each of the one or more blockchain nodes and the one or more execution nodes, wherein the reputational budget is computed based on one or more risk assessment values recorded on a risk blockchain;

temporarily decreasing the reputational budget of the one or more blockchain nodes issuing the smart contract upon granting the execution of the smart contract by the one or more execution nodes, wherein the temporary decrease is recorded on the risk blockchain;

subsequent to recording the one or more risk assessment values having been determined factoring in the reputational budget on the risk blockchain, cancelling the temporary decrease to the reputational budget and reinstating a value of the reputational budget prior to the temporary decrease; and executing the smart contract by the one or more execution nodes.

2. The method of claim 1, further including recording historical data of the risk assessment and the reputation of both the one or more blockchain nodes and the primary blockchain, wherein the primary blockchain is an execution node, the secondary blockchain is the risk blockchain, and a blockchain issuing the smart contract is one of a plurality of nodes inclusive of the primary blockchain and the risk blockchain.

3. The method of claim 1, further including recording an execution ask, an execution bid, and an execution operation of the smart contract issued by the one or more blockchain nodes for execution of the smart contract by the one or more execution nodes, wherein the execution ask includes one or more parameters defining execution protocols for executing the smart contract, the execution bid indicates a transaction agreement rate between the one or more blockchain nodes and the one or more execution nodes for honoring the execution ask.

4. The method of claim 1, further including matching, via the secondary blockchain, an execution ask and an execution bid of the smart contract issued by the one or more blockchain nodes for execution of the smart contract by the one or more execution nodes, wherein the execution ask includes one or more parameters defining execution protocols for executing the smart contract, the execution bid indicates a transaction agreement rate between the one or more blockchain nodes and the one or more execution nodes for honoring the execution ask.

5. The method of claim 1, further including applying a risk analysis operation to the smart contract and storing one or more values output by the risk analysis operation to the secondary blockchain.

6. The method of claim 1, further including aggregating the one or more risk assessment values generated by the secondary blockchain and associated with the smart contract.

7. The method of claim 1, further including:
using the marketplace to provide a transaction agreement for execution services of the smart contract based on the risk assessment to the smart contract; and
tracking the reputation of both the one or more blockchain nodes and the one or more execution nodes based on the risk assessment in the marketplace, wherein the marketplace includes the one or more blockchain nodes, the primary blockchain, and the secondary blockchain.

8. A system for implementing a marketplace for risk assessed smart contracts in blockchains in a computing environment, comprising:
one or more computers with executable instructions that when executed cause the system to:
receive a smart contract issued by one or more blockchain nodes to a secondary blockchain and accepted by a primary blockchain;

in response to receiving the contract, perform a risk assessment to recursive call attack vulnerabilities of the smart contract, wherein the risk assessment identifies a probability of asset depletion in an asset management environment due to an exploitation of recursive functions to application agents in the primary blockchain based on a determined risk of re-entry calls occurring during a particular time window;

in conjunction with performing the risk assessment, determine a reputation of both the one or more blockchain nodes issuing the smart contract and one or more execution nodes which will execute the smart contract according to a reputational budget computed for each of the one or more blockchain nodes and the one or more execution nodes, wherein the reputational budget is computed based on one or more risk assessment values recorded on a risk blockchain;

temporarily decrease the reputational budget of the one or more blockchain nodes issuing the smart contract upon granting the execution of the smart contract by the one or more execution nodes, wherein the temporary decrease is recorded on the risk blockchain;

subsequent to recording the one or more risk assessment values having been determined factoring in the reputational budget on the risk blockchain, cancel the temporary decrease to the reputational budget and reinstating a value of the reputational budget prior to the temporary decrease; and execute the smart contract by the one or more execution nodes.

9. The system of claim 8, wherein the executable instructions further record historical data of the risk assessment and the reputation of both the one or more blockchain nodes and the primary blockchain, wherein the primary blockchain is an execution node, the secondary blockchain is the risk blockchain, and a blockchain issuing the smart contract is one of a plurality of nodes inclusive of the primary blockchain and the risk blockchain.

10. The system of claim 8, wherein the executable instructions further record an execution ask, an execution bid, and an execution operation of the smart contract issued by the one or more blockchain nodes for execution of the smart contract by the one or more execution nodes, wherein the execution ask includes one or more parameters defining execution protocols for executing the smart contract, the execution bid indicates a transaction agreement rate between the one or more blockchain nodes and the one or more execution nodes for honoring the execution ask.

11. The system of claim 8, wherein the executable instructions further match, via the secondary blockchain, an execution ask and an execution bid of the smart contract issued by the one or more blockchain nodes for execution of the smart contract by the one or more execution nodes, wherein the execution ask includes one or more parameters defining execution protocols for executing the smart contract, the execution bid indicates a transaction agreement rate between the one or more blockchain nodes and the one or more execution nodes for honoring the execution ask.

12. The system of claim 8, wherein the executable instructions further apply a risk analysis operation to the smart contract and store one or more values output by the risk analysis operation to the secondary blockchain.

13. The system of claim 8, wherein the executable instructions further aggregate the one or more risk assessment values generated by the secondary blockchain and associated with the smart contract.

14. The system of claim 8, wherein the executable instructions further:
  using the marketplace to provide a transaction agreement for execution services of the smart contract based on the risk assessment to the smart contract; and
  track the reputation of both the one or more blockchain nodes and the one or more execution nodes based on the risk assessment in the marketplace, wherein the marketplace includes the one or more blockchain nodes, the primary blockchain, and the secondary blockchain.

15. A computer program product for implementing a marketplace for risk assessed smart contracts in blockchains by a processor, the computer program product comprising a non-transitory computer-readable storage medium having computer-readable program code portions stored therein, the computer-readable program code portions comprising:
  an executable portion that receives a smart contract issued by one or more blockchain nodes to a secondary blockchain and accepted by a primary blockchain;
  an executable portion that, in response to receiving the contract, performs a risk assessment to recursive call attack vulnerabilities of the smart contract, wherein the risk assessment identifies a probability of asset depletion in an asset management environment due to an exploitation of recursive functions to application agents in the primary blockchain based on a determined risk of re-entry calls occurring during a particular time window;
  an executable portion that, in conjunction with performing the risk assessment, determines a reputation of both the one or more blockchain nodes issuing the smart contract and one or more execution nodes which will execute the smart contract according to a reputational budget computed for each of the one or more blockchain nodes and the one or more execution nodes, wherein the reputational budget is computed based on one or more risk assessment values recorded on a risk blockchain;
  an executable portion that temporarily decreases the reputational budget of the one or more blockchain nodes issuing the smart contract upon granting the execution of the smart contract by the one or more execution nodes, wherein the temporary decrease is recorded on the risk blockchain;
  an executable portion that, subsequent to recording the one or more risk assessment values having been determined factoring in the reputational budget on the risk blockchain, cancels the temporary decrease to the reputational budget and reinstating a value of the reputational budget prior to the temporary decrease; and
  an executable portion that executes the smart contract by the one or more execution nodes.

16. The computer program product of claim 15, further including an executable portion that records historical data of the risk assessment and the reputation of both the one or more blockchain nodes and the primary blockchain, wherein the primary blockchain is an execution node, the secondary blockchain is the risk blockchain, and a blockchain issuing the smart contract is one of a plurality of nodes inclusive of the primary blockchain and the risk blockchain.

17. The computer program product of claim 15, further including an executable portion that records an execution ask, an execution bid, and an execution operation of the smart contract issued by the one or more blockchain nodes for execution of the smart contract by the one or more execution nodes, wherein the execution ask includes one or more parameters defining execution protocols for executing the smart contract, the execution bid indicates a transaction agreement rate between the one or more blockchain nodes and the one or more execution nodes for honoring the execution ask.

18. The computer program product of claim 15, further including an executable portion that matches, via the secondary blockchain, an execution ask and an execution bid of the smart contract issued by the one or more blockchain nodes for execution of the smart contract by the one or more execution nodes, wherein the execution ask includes one or more parameters defining execution protocols for executing the smart contract, the execution bid indicates a transaction agreement rate between the one or more blockchain nodes and the one or more execution nodes for honoring the execution ask.

19. The computer program product of claim 15, further including an executable portion that:
  applies a risk analysis operation to the smart contract;
  stores one or more values output by the risk analysis operation to the secondary blockchain; and
  aggregates the one or more risk assessment values generated by the secondary blockchain and associated with the smart contract.

20. The computer program product of claim 15, further including an executable portion that:
  using the marketplace to provide a transaction agreement for execution services of the smart contract based on the risk assessment to the smart contract; and
  tracks the reputation of both the one or more blockchain nodes and the one or more execution nodes based on the risk assessment in the marketplace, wherein the marketplace includes the one or more blockchain nodes, the primary blockchain, and the secondary blockchain.

* * * * *